United States Patent [19]

Möltgen et al.

[11] Patent Number: 5,256,611
[45] Date of Patent: Oct. 26, 1993

[54] COLORED CORUNDUM COMPOSITE AND PROCESSES FOR ITS PRODUCTION AND ITS USE

[75] Inventors: Paul Möltgen, Laufenburg; Gerhard Winter, Goslar; Fister Dietmar, Murg-Niederhof, all of Fed. Rep. of Germany

[73] Assignee: H. C. Starck GmbH & Co. KG, Goslar, Fed. Rep. of Germany

[21] Appl. No.: 910,439

[22] Filed: Jul. 8, 1992

[30] Foreign Application Priority Data

Jul. 25, 1991 [DE] Fed. Rep. of Germany ....... 4124630

[51] Int. Cl.$^5$ ............................................... C04B 35/10
[52] U.S. Cl. ............................... 501/127; 106/450; 106/451; 106/456; 106/480
[58] Field of Search ............... 501/127, 153; 106/450, 106/451, 453, 454, 456, 459, 480, 483

[56] References Cited

U.S. PATENT DOCUMENTS

| | | | |
|---|---|---|---|
| 2,618,567 | 11/1952 | Comstock, III | 106/62 |
| 3,108,888 | 10/1963 | Bugosh | 106/62 |
| 3,454,385 | 7/1969 | Amero | 51/298 |
| 3,909,991 | 10/1975 | Coes, Jr. | 51/309 |
| 4,285,726 | 8/1981 | Hund et al. | 106/14.05 |
| 4,314,827 | 2/1982 | Leitheiser et al. | 51/298 |
| 4,623,364 | 11/1986 | Cottringer et al. | 51/309 |

FOREIGN PATENT DOCUMENTS

| | | |
|---|---|---|
| 0024099 | 6/1980 | European Pat. Off. . |
| 0200487 | 4/1986 | European Pat. Off. . |
| 0384760 | 2/1990 | European Pat. Off. . |
| 2099012A | 5/1982 | United Kingdom . |

OTHER PUBLICATIONS

Database WPIL GB Derwent Publications Ltd. London, GB Patent Abstracts of Japan, vol. 10, No. 94 (C-388) Apr. 11, 1986.

*Primary Examiner*—Karl Group
*Assistant Examiner*—Chris Gallo
*Attorney, Agent, or Firm*—Jerry Cohen; Harvey Kaye

[57] ABSTRACT

Colored corundum composite with a matrix of $\alpha$-$Al_2O_3$, as formed by sol-gel process ending in sintering and size reduction steps with addition of oxide pigments (or precursors of such oxide pigments, formable to the oxide pigment in sinter heating) added to the sol before full gelation thereof.

7 Claims, No Drawings

COLORED CORUNDUM COMPOSITE AND PROCESSES FOR ITS PRODUCTION AND ITS USE

BACKGROUND OF THE INVENTION

This invention relates to an $\alpha$-$Al_2O_3$-based colored sintered corundum containing metal oxides, to a process for its production and to its use.

The production of abrasion-resistant colored layers is of considerable importance in the ceramic industry and also in other branches of industry.

By virtue of their heat resistance, pigments commonly used for ceramics or enamels are oxides, pure and mixed phases of spinel structure, rutile mixed phases, $ZrO_2$ mixed phases, zirconium silicate mixed phases and others. These inorganic pigments or rather colored pigments are either colored individual compounds or hosts in which coloring ions are incorporated with mixed phase formation (Ullmann's Encyclopedia of Technical Chemistry, 4th Edition, Vol. 18, pages 599–628).

The low hardness of the pigments imposes limits on the production of highly abrasion-resistant colored layers of the type required, for example, for floor tiles, tools or other parts exposed to heavy wear. The hardness of the pigments is between 5 and 8 on the Mohs scale.

By contrast, corundum is eminently suitable for protection against wear by virtue of its extreme hardness (9 on the Mohs scale). In addition, the high temperature stability and chemical resistance of corundum both have positive effects in this regard. However, since pure corundum is colorless, it is unsuitable for the production of wear-resistant layers which, apart from their protective effect, are also intended to have a decorative character.

Although colored fused corundums containing $Cr_2O_3$, NiO, CoO, $Fe_2O_3$, $TiO_2$ and/or $V_2O_5$ or other components have been described, the use of these colored fused corundums for the production of colored wear-resistant decorative layers has the disadvantage that only a very limited color spectrum with colors of low intensity is available. Another disadvantage lies in the unfavorable light-refracting behavior of fused corundum so that finely ground corundum appears very light and almost colorless.

In addition, many of the limited range of oxides which can actually be used in the corundum melt on account of its stability are toxic, so that processing in an open arc furnace is extremely problematical.

Most of the known colored fused corundums are unsuitable for decorative purposes.

Layers in which white corundum has been processed together with pigments are attended by the disadvantage that homogeneous layers can only be formed with very considerable effort.

In addition, the pigment present in addition to the corundum undergoes distinctly higher wear than the corundum and is eliminated from the layer under the severe stressing which the corundum is designed to withstand. As a result, there is initially a reduction in the intensity of color. In addition, foreign particles, such as dirt, can collect in the holes formed so that the original color fades to grey.

Overall, abrasion resistance suffers and protection against wear is unsatisfactory.

The problem addressed by the present invention, and the object thereof, are to provide a colored corundum which does not have any of the disadvantages described above.

SUMMARY OF THE INVENTION

It has now been surprisingly been found that the stated requirements are satisfied to an excellent degree by a sintered corundum containing coloring metal oxides. Accordingly, the present invention relates to an $\alpha$-$Al_2O_3$-based colored sintered corundum containing metal oxides, characterised in that the metal oxides are inorganic pigments and/or colored pigments and the quantity of metal oxides, expressed as metal ions, is 0.1 to 30% by weight.

Sintered corundums and processes for their production are described in numerous patent specifications, for example in the U.S. Pat. Nos. 3,454,385; 3,909,991; 2,618,567 and 3,108,888.

Sintered corundums based on $\alpha$-$Al_2O_3$ have recently been used in abrasives, their microcrystalline structure affording particular advantages for this particular application.

U.S. Pat. No. 4,314,827 describes a microcrystalline sintered corundum which is produced by the sol-gel technique at sintering temperatures of the order to 1,400° C. A modified component, such as $HfO_2$, $ZrO_2$, MgO, ZnO, CoO, NiO, etc., is added as a sintering aid.

An economic process for the production of sintered corundum from $\alpha$-$Al_2O_3$ is known from European patent 394 501.

European patent 152 768 describes an abrasive material which is also produced by sintering of an aluminium oxide hydrate gel. In this case, very fine $\alpha$-$Al_2O_3$ particles are added as nucleating agents to reduce the transition temperature from $\gamma$-$Al_2O_3$ to $\alpha$-$Al_2O_3$. Further additions to crystal growth inhibitors, such as MgO, $SiO_2$, $Cr_2O_3$, $Fe_2O_3$, $ZrO_2$, may also be used.

In one preferred embodiment, the $\alpha$-$Al_2O_3$ phase in the colored corundum accordingly to the invention was obtained by the sol-gel process. At sintering temperatures of 1,200° to 1,400° C., it is possible to obtain a dense and extremely hard sub-micron $\alpha$-$Al_2O_3$ matrix in which the pigments are incorporated in uniform distribution. The sintered corundum preferably has a primary particle size of 0.1 to 3 $\mu$m and preferably 0.1 to 1 $\mu$m.

The color of the corundums according to the invention is obtained by the incorporation of coloring metal oxides. Any coloring oxides, including for example oxides of chromium, vanadium, iron, nickel, cobalt etc. are suitable for this purpose. The metal oxides according to this invention are inorganic pigments and/or pigments.

The present invention also relates to a process for the production of the colored corundum according to the invention. This process is characterized in that inorganic pigments and/or colored pigments are added during the production of $\alpha$-$Al_2O_3$ by the sol-gel process.

The coloring component is added in the form of a fine powder or in the form of colloidal solution. It is possible to use either the pigment itself or a precursor which reacts to form the pigment during the production process.

The corundum pigments thus produced are distinguished by extremely homogeneous distribution of the coloring pigments in the corundum matrix. The matrix itself is neutral in color, substantially transparent and has surprisingly little effect on the original color intensity of the pigment. Even with small quantities of added color pigment, it is possible to produce intensively colored corundums which retain their color intensity even in the fine particle range.

The low sintering temperatures enable virtually any known oxidic colored pigments to be incorporated. Surprisingly, it has even been found that temperature-sensitive colored pigments, such as rutile pigments for example, are stabilized in the matrix.

Accordingly, the colored corundums according to the invention have the additional advantage that they are also of interest for applications where the stability of the colored pigment rather than its hardness is the key criterion.

Certain metal oxides, such as $Cr_2O_3$ for example, have been found to enter into reactions with the matrix. These oxides are thus incorporated in the $Al_2O_3$ lattice so that the original color of the pigment is lost and new colors are formed. The color intensity of the colored corundums obtained in this case is very good.

Accordingly, the process according to the invention for the production of colored corundums has the additional advantage that it is eminently suitable for the production of new pigments. Further color reactions are possible through the combined use of various colored pigments or metal oxides.

In addition, the quality of the colored corundums (hardness, microcrystalline structure) can be improved by the additional use of sintering aids and/or crystallization nuclei. It is possible in this way to obtain a microcrystalline matrix in a range in which the $Al_2O_3$ crystallites have a primary crystallite size below 0.5 micron. This sub-micron $\alpha$-$Al_2O_3$ matrix is distinguished by particular hardness and strength and provides for even more homogeneous distribution of the colored pigments.

The percentage content of coloring metal oxides, based on the $Al_2O_3$ matrix, may be varied as required according to the particular application envisaged for the corundum pigments.

For applications depending above all on the hardness of the corundum in combination with its color, it is advisable to use colored pigments in quantities of 0.1 to 15% by weight and preferably in quantities of 1 to 10% by weight, based on the $Al_2O_3$ matrix.

With larger percentage contents of coloring components in the matrix, the original hardness of the matrix is gradually lost. Smaller percentage contents than 0.1% by weight are inappropriate on account of the low color intensity of the colored corundum thus formed.

If the color-stabilizing effect of the matrix is desired for certain sensitive pigments, it is appropriate to use colored pigments in quantities of 0.1 to 30% by weight, based on the $Al_2O_3$ matrix.

Colored corundums with higher percentage contents have the disadvantage for the application stated above that the stabilizing effect diminishes with increasing concentration of the colored pigment in the matrix whereas color intensity is very good, even at relatively low concentrations, and is only negligibly improved with increasing concentration.

If the process according to the invention is used for the production of new pigments, even higher percentage contents of foreign oxide in the $Al_2O_3$ matrix are appropriate.

Accordingly, the present invention also relates to the use of the corundum according to the invention for the production of wear-resistant, colored ceramic layers.

The colored corundums according to the invention may be applied to a substrate by plasma spraying. The particle size of the corundum should be smaller than 50 $\mu$m for this purpose. In the form of relatively coarse particles (50 to 250 $\mu$m), the colored corundum according to the invention may advantageously be used for protecting floor tiles against wear. The colored corundum according to the invention may also be used with advantage as a pigment. This pigment is particularly suitable, as a pigment in glazes. However, the pigment according to the invention is also eminently suitable for coloring organic systems, such as plastics and lacquers.

DETAILED DESCRIPTION OF PREFERRED EMBODIMENTS

The following examples are intended to illustrate the invention without limiting it in any way.

EXAMPLE 1

A sol-gel process was carried out as follows:

500 g aluminum oxide monohydrate (Disperal, a product of Condea) were dispersed in 2 l water with addition of acid ($HNO_3$). The suspension was heated to a temperature of 100° C. over the course of 30 minutes and held 15 minutes with continuous stirring and 18.75 g of a zirconium/vanadium blue pigment (V-containing $ZrSiO_4$) were added, 10 ml nitric acid being introduced dropwise at the same time during the course of heating and before gelation had occurred. Even on heating there was a distinct increase in the viscosity of the sol. A few minutes after the pigment had been completely added, the gelation process was complete. The gel was then dried at 70° C. in a drying cabinet. The dried gel was calcined at 500° C. for 30 minutes and then sintered for 4 hours at 1,350° C.

The colored corundum can be size-reduced (comminuted) to the desired particle size before or after sintering.

| Pigment content (% by weight) | Analysis Hardness (GPa) (HV 0.2) | Density | Color |
| --- | --- | --- | --- |
| 5% | 18.3 | 97.5% | Co blue |

The color intensity of the corundum pigment was comparable with that of the colored pigment used. The corundum pigment was size-reduced to a particle size range of −250/+50 microns and was used for coating abrasion-resistant floor tiles.

EXAMPLE 2

Preparation was carried out as in Example 1.

The zirconium/vanadium blue pigment was replaced by a blue-green CoCr spinel.

| Pigment content (% by weight) | Analysis Hardness (GPa) (HV 0.2) | Density | Color |
| --- | --- | --- | --- |
| 5% | 19.7 | 96.5% | dark blue |

The original color of the pigment changed from turquoise to dark blue during the production process.

EXAMPLE 3

Preparation was carried out as in Example 1.

A pink-colored sphene pigment (Cr(III)-CaSn silicate) was used as the colored pigment.

| | Analysis | | |
|---|---|---|---|
| Pigment content (% by weight) | Hardness (GPa) (HV 0.2) | Density | Color |
| 5% | 16.4 | 95.8% | Pink |

By comparison with the pure colored pigment, the intensity of the color diminished only slightly during the production process.

The pure pigment is not particularly heat-stable. In combination with corundum, the pigment is stable and may even be used without difficulty for ceramic purposes. The pigment was size-reduced to smaller than 50 microns and was processed in glazes.

EXAMPLE 4

Preparation as in Example 1.
Chromoxid GN (a product of Bayer AG) was used as the coloring component.

| | Analysis | | |
|---|---|---|---|
| Pigment content (% by weight) | Hardness (GPa) (HV 0.2) | Density | Color |
| 20% ($Cr_2O_3$) | 16.3 | 98.9% | Pink |

The originally green $Cr_2O_3$ is incorporated in the $Al_2O_3$ lattice and a bright pink-colored, very stable pigment is formed.

We claim:

1. An abrasion resistant $\alpha$-$Al_2O_3$-based colored sintered corundum with an essentially transparent corundum matrix containing metal oxides integrally formed therewith in the sinter mass and homogeneously distributed therein and imparting intense color thereto, the metal oxides being inorganic colored pigments and the quantity of said metal oxides, expressed as metal ions, being 0.1 to 30% by weight based on the $Al_2O_3$ matrix.

2. A colored corundum according to claim 1, characterised in that the $\alpha$-$Al_2O_3$ phase has been obtained by the sol-gel process.

3. A colored corundum according to one of claims 1 or 2, characterised in that the sintered corundum has a primary crystallite size of 0.1 to 3 $\mu$m.

4. A process for the production of a colored corundum according to one either of claims 1 or 2 characterised in that inorganic pigments are added during the production of $\alpha$-$Al_2O_3$ by the sol-gel process.

5. A colored corundum according to claim 3 wherein the primary crystallite size is within the 0.1 to 1$\mu$ range.

6. The colored corundum of claim 2 as produced by adding the oxide in the sol-gel process before gelation.

7. The process of claim 2 wherein the oxide is added before gelation.

* * * * *